United States Patent
Hemme et al.

(10) Patent No.: US 11,953,355 B2
(45) Date of Patent: Apr. 9, 2024

(54) UTILITY METER INCLUDING A TEMPERATURE SENSOR DETECTION ALGORITHM

(71) Applicant: Kamstrup A/S, Skanderborg (DK)

(72) Inventors: Kasper Hemme, Skanderborg (DK); Mads Erik Lund Jensen, Skanderborg (DK); Allan Jensen, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 409 days.

(21) Appl. No.: 17/434,806

(22) PCT Filed: Feb. 27, 2020

(86) PCT No.: PCT/DK2020/050054
§ 371 (c)(1),
(2) Date: Aug. 30, 2021

(87) PCT Pub. No.: WO2020/177826
PCT Pub. Date: Sep. 10, 2020

(65) Prior Publication Data
US 2022/0163359 A1  May 26, 2022

(30) Foreign Application Priority Data
Mar. 1, 2019 (DK) .......................... PA 2019 70145

(51) Int. Cl.
*G01F 1/66* (2022.01)
*G01K 7/18* (2006.01)
*G01K 13/02* (2021.01)

(52) U.S. Cl.
CPC ................. *G01F 1/66* (2013.01); *G01K 7/18* (2013.01); *G01K 13/026* (2021.01)

(58) Field of Classification Search
None
See application file for complete search history.

(56) References Cited

U.S. PATENT DOCUMENTS

2012/0245884 A1* 9/2012 Wohrle ............... G01K 17/12
702/130

FOREIGN PATENT DOCUMENTS

CN  109342841 A  2/2019
EP  2000788 A1  12/2008

(Continued)

OTHER PUBLICATIONS

International Search Report and Written Opinion dated May 25, 2020, for International Patent Application No. PCT/DK2020/050054.

(Continued)

*Primary Examiner* — Raul J Rios Russo
*Assistant Examiner* — Carl F. R. Tchatchouang
(74) *Attorney, Agent, or Firm* — Renner, Otto, Boisselle & Sklar, LLP

(57) ABSTRACT

Utility meter for measuring thermal energy delivered to a point of consumption by a fluid supplied via a supply flow and a return flow, including a flow meter unit for measuring a supply flow rate or return flow rate of the fluid; a pair of temperature sensing probes for measuring temperatures of the supply flow and the return flow, each of the temperature sensing probes including a resistive temperature device; and a calculator device configured for executing a measuring algorithm for determining an amount of thermal energy delivered to the point of consumption over a period of time based on flow rates and temperatures received from the flow meter unit and temperature sensing probes, respectively; wherein the calculator device is configured to detect the type of resistive temperature device included in the temperature sensing probes and to adapt the measuring algorithm according to the type of resistive temperature device.

7 Claims, 2 Drawing Sheets

(56) References Cited

FOREIGN PATENT DOCUMENTS

| EP | 2743661 A1 | 6/2014 |
| GB | 2548429 A | 9/2017 |
| KR | 20180008077 A | 1/2018 |

OTHER PUBLICATIONS

Search Report dated Sep. 2, 2019, for Danish Patent Application No. PA 2019 70145.
Kamstrup A/S; Technical Description—Multical 801; May 6, 2017; pp. 1-121.
Kamstrup A/S; Technical Description—Multical 803; Mar. 22, 2019; pp. 1-171.

* cited by examiner

UTILITY METER INCLUDING A TEMPERATURE SENSOR DETECTION ALGORITHM

This application is a national phase of International Application No. PCT/DK2020/050054 filed Feb. 27, 2020, which claims priority to Denmark Application No. PA 2019 70145 filed Mar. 1, 2019, the entireties of which are hereby incorporated by reference.

FIELD OF THE INVENTION

The present invention relates to a utility meter for measuring thermal energy, such as heat or cooling, configured for autonomously detecting the type of temperature sensing probe connected to the meter.

BACKGROUND OF THE INVENTION

Utility meters are used for measuring fluid flow and consumption of utilities, such as heat, cooling or water. Utility meters, such as thermal energy meters for heat or cooling, measure flow and calculate consumption over the course of time. When measuring heat or cooling energy delivered to a point of consumption, both flow and temperature must be measured to determine consumption. Flow may be measured using various technologies, such a mechanical flow meters and ultrasound flow meters. Temperature may also be measured using various technologies, such as thermocouples, thermistors or resistive temperature devices (RTD).

Temperature sensing probes using resistive temperature devices are often used because of their accuracy and long-term stability. When probes including resistive temperature devices are used, temperature changes are detected by measuring changes in the resistance of the RTD. The resistance of the RTD changes with the temperature in a known manner and by continuously monitoring the resistance, temperature changes are detected. An often-used material for resistive temperature devices is platinum, but other metals may also be used.

Resistive temperature devices are categorised by their material of manufacturing and a reference resistance of the RTD in ohms ($\Omega$) at 0° C. An often used material is platinum (Pt) devices having a reference resistance of 100 or 500 ohms at 0° C. Such devices are denoted Pt-100 and Pt-500, respectively.

Traditionally, utility meters have been configured during manufacturing to use a sensing probe including a specific type of RTD, such as a Pt-100 or Pt-500. Configuration has been done during manufacturing since the measuring algorithm varies depending on the type of sensor. When the utility meter has been configured to a probe using a specific type of RTD, only probes using that type of RTD can be connected to the utility meter during installation.

This however creates variance and creating variance during manufacturing should be postponed as far as possible down the value chain. Configuration of a utility meter during installation may on the other hand increase the risk of installation errors leading to erroneous consumption measurements.

Therefore, a utility meter capable of using temperature sensing probes including different types of resistive temperature devices would be advantageous.

OBJECT OF THE INVENTION

It is an object of the present invention to provide an alternative to the prior art. In particular, it may be seen as an object of the present invention to provide a utility meter allowing connection of temperature sensing probes including different types of resistive temperature devices.

SUMMARY OF THE INVENTION

The above described object and several other objects are intended to be obtained in a first aspect of the invention by providing a utility meter for measuring thermal energy delivered to a point of consumption by a fluid supplied via a supply flow and a return flow, including a flow meter unit for measuring a supply flow rate or return flow rate of the fluid; a pair of temperature sensing probes for measuring temperatures of the supply flow and the return flow, each of the temperature sensing probes including a resistive temperature device; and a calculator device configured for executing a measuring algorithm for determining an amount of thermal energy delivered to the point of consumption over a period of time based on flow rates and temperatures received from the flow meter unit and temperature sensing probes, respectively; wherein the calculator device is configured to detect the type of resistive temperature device included in the temperature sensing probes and to adapt the measuring algorithm according to the type of resistive temperature device. The type of resistive temperature device included in the temperature sensing probes is detected using a sensor detection algorithm which includes the steps of:

attempting to measure temperature using a measuring algorithm adapted to a first type of temperature sensing probes, such as temperature sensing probes including resistive temperature devices of the Pt-100 type, attempting to measure temperature using a measuring algorithm adapted to a second type of temperature sensing probes, such as temperature sensing probes including resistive temperature devices of the Pt-500 type, and determining which of the temperature measurements that are valid.

Based on the knowledge of the validity—i.e. the correctness—of the temperature measurements made during the sensor detection algorithm the calculator device of the utility meter selects that measuring algorithm which matches the temperature sensing probe. The measuring algorithm selected is then used afterwards by the utility meter in daily operation.

An advantage of the sensor detection algorithm is that different types of temperature sensing probes may be connected to a utility meter or calculator device and valid temperature differences may be detected by the calculator device independently of the type of resistive temperature devices used in the temperature sensing probes connected to the calculator device.

Typically the calculator device of the utility meter will be set to a default measuring algorithm in the factory and this algorithm corresponds to the RTD of the temperature sensing probe. The sensor detection algorithm can advantageously be initiated as a quality check in the factory or when installing the utility meter or when new probes are installed by a service technician. When initiated, the sensor detection algorithm of the utility meter initially makes the assumption that a specific temperature probe is connected and typically the default setting or the last setting is assumed. The resistance range—i.e. the resistance as a function of temperature—of this probe is known to the meter. A measured resistance value is then compared to data values in this known range and if the measured resistance value is outside the range the initial assumption is discarded, and a new assumption is made. This time an assumption of another type of temperature sensing probe being connected is made and another measuring algorithm is used. A new measurement is performed and if the measured resistance value is inside the ohmic range of this type of sensor a determination of the type of temperature probe can be made. The technical effect of this sensor detection algorithm is that with only one or with very few measurements automatically performed by the calculator device of the utility meter an effective validation of the connected temperature sensing probes can be achieved in a short time. The algorithm is simple and does not need time or data memory to establish a full characteristic of the probe in order to finalize the validation.

Advantageously, after having made the sensor detection measurements, a permanent change in configuration of the utility meter to another measuring algorithm is only done if the measurements performed during the sensor detection algorithm has provided fully trustworthy data. Sometimes a floating voltage in the sensing probe can cause a wrong measurement even though the sensor in reality is matching the measuring algorithm. Therefore the detection algorithm is reiterated a plurality of times before the automated decision of a change in measuring algorithm is taken.

A change in configuration to another measuring algorithm will not be made if a measurement on a temperature sensing probe using a first signal injection type during the sensor detection algorithm results in a sensor determination which is different from another determination of the same temperature sensing probe when using said first signal injection type. This means that if contradictory measuring results appear the original or actual configuration file will be kept.

It is especially advantageous if the resistance ranges of the RTDs of the two temperature sensing probes do not overlap. When designing the utility meter and selecting types of temperature sensing probes care should be taken that the two sensing probes do not give a signal output at the same temperature, and this can for example be achieved with a first probe covering a range of 100-180 Ohms and a second probe covering 500-880 Ohms. This non-overlap makes detection of the temperature sensing probe easier.

The terms type of temperature sensing probe, type of resistive temperature device, types of sensing probes and sensor probe type are used interchangeably to mean different types of temperature sensing probes using different types of resistance temperature devices.

This and other aspects of the invention will be apparent from the following description with reference to the described embodiments.

BRIEF DESCRIPTION OF THE FIGURES

The utility meter according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
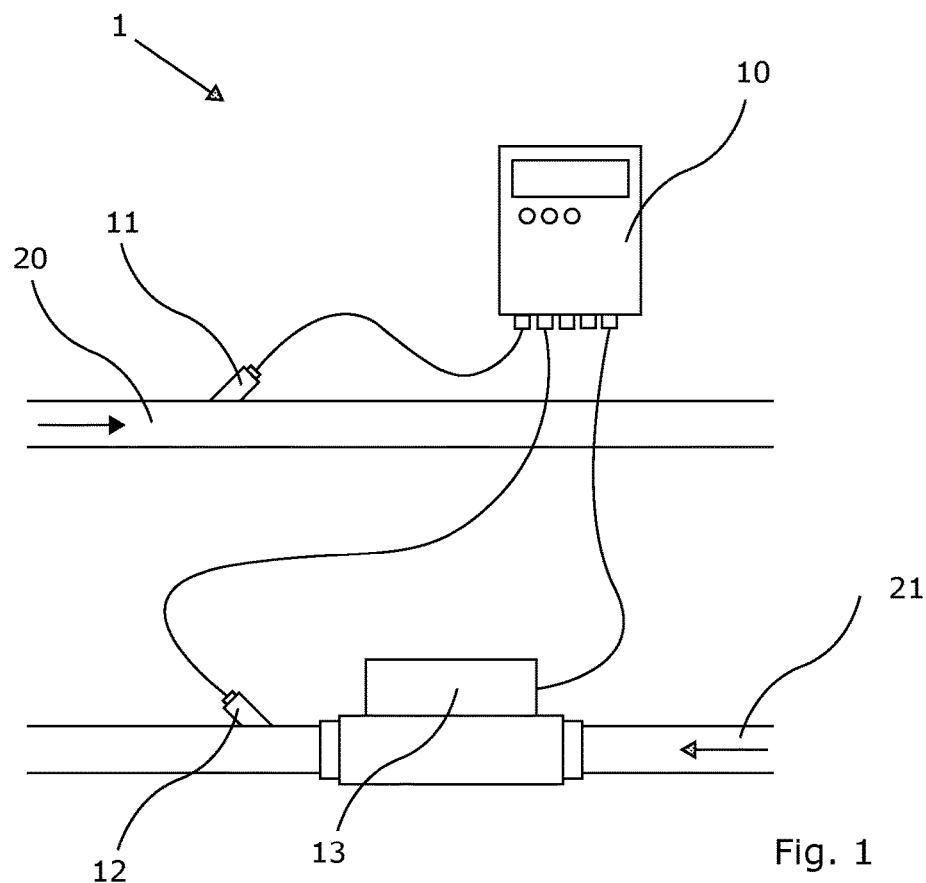
FIG. 1 shows a schematic drawing of a utility meter for measuring thermal energy.

FIG. 1 shows a schematic illustration of a utility meter 1 for measuring thermal energy delivered to a point of consumption by a fluid supplied via a supply flow 20 and a return flow 21. The utility meter includes a calculator device 10 receiving flow information from a flow meter unit 13 and temperature information from a pair of temperature sensing probes 11,12.

In the shown embodiment the flow meter unit is mounted in the return flow to measure the return flow rate of the fluid. In another embodiment the flow meter unit may be mounted in the supply flow to measure the supply flow rate. The temperature sensing probes are mounted to measure the temperature of the supply flow and the return flow, respectively.

In the shown embodiment the calculator device 10, flow unit 13 and temperature sensing probes are illustrated as separate units connected by cables. However, as is know in the art, two or more of these devices may be integrated into one common device.

The flow meter unit may include an ultrasound flow meter using transit time flow measurements to determine the flow rate of the return flow. The known operation principle for transit time flow meters is based on ultrasonic signals being transmitted upstream and downstream in the flowing fluid between to transducers. Based on transit time differences between oppositely propagating signals the flow rate is determined. However, the flow meter unit may also include a flow meter using other known technologies for measuring fluid flow, such as mechanical flow meters or magnetic inductive flow meters.

The temperature sensing probes are a matched pair of probes of the Pt-500- or Pt-100 type. However, the temperature sensing probes may also include resistive temperature devices with other specifications using resistor metals different from platinum and having different reference resistances. For example, the resistive temperature devices may have reference resistances from 50-1000 ohms at 0° C.

Figure 2A:
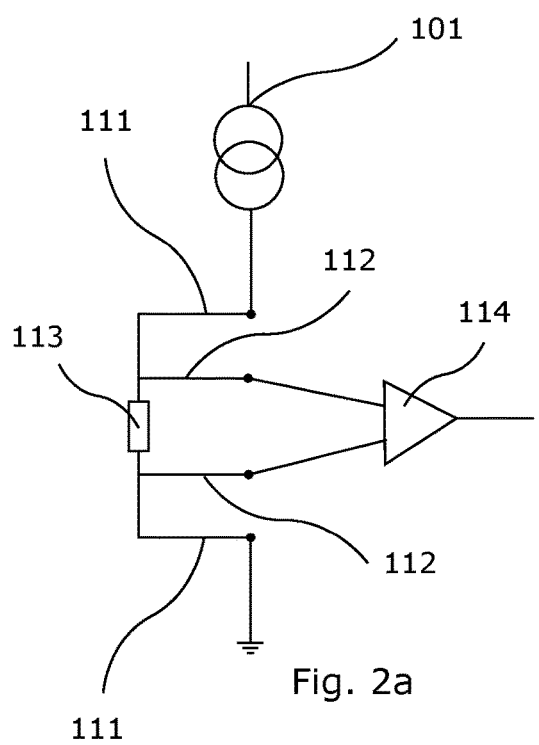
FIG. 2a shows a circuit diagram of a circuit for measuring temperature using a resistive temperature device.
Figure 2B:
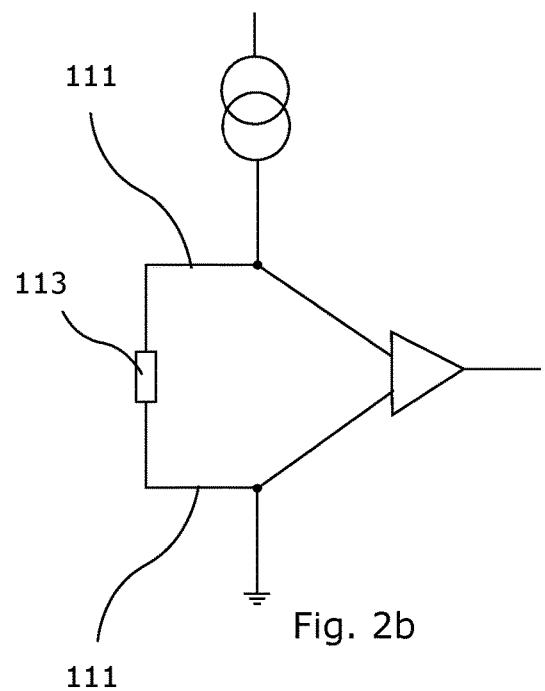
FIG. 2b shows a circuit diagram of another circuit for measuring temperature using a resistive temperature device.

The calculator device includes a temperature measurement circuit 101 to which wires of the temperature sensing probes are connected as illustrated in FIG. 2a and FIG. 2b. Further, the calculator device is configured for executing a measuring algorithm for determining an amount of thermal energy delivered to the point of consumption over a period of time based on flow rates and temperatures received from the flow meter unit and the temperature sensing probes, respectively. The measuring algorithm is dependent on the type of temperature sensing probes used and configured to measure inlet and outlet temperatures in a range from 0.00° C. to 195.00° C.

During each temperature measurement, the calculator device makes a signal injection and sends a measuring current through each of the two temperature sensing probes according to the schematic electrical diagram shown in FIGS. 2a and 2b. In one embodiment the measuring current is approx. 0.5 mA when Pt-500 sensing probes are connected to the calculator device and approx. 2.5 mA when Pt-100 probes are connected. A measuring current is only sent through the temperature sensors during the short duration of the temperature measurement, thereby reducing the effective power that is deposited in the sensor elements, and its influence on self-heating of the temperature sensors.

Referring to FIG. 2a, the temperature sensing probes connected to the calculator device are 4-wire sensing probes. Two supply wires 111 are connected to a constant current generator 101 and used to supply the resistive temperature device 113 (RTD) and two sensing wires 112 are used for measuring the voltage drop across the RTD. An amplifier 114 amplifies the voltage difference across RTD 113.

In another embodiment illustrated in FIG. 2b, only two wires 111 are connected to the RTD 113. In this embodiment the same wires are thus used for supplying the supply current and for measuring the voltage drop across the RTD.

The above described use of a constant current generator should only be considered an exemplary embodiment. Other measuring circuits may also be used for measuring changes in the resistance of the RTD, such as circuits including a voltage source, voltage dividers or a Wheatstone bridge. In some embodiments, 3-wire temperature sensing probes may also be used as envisaged by the skilled person.

The calculator device is further configured to detect the type of temperature sensing probes (i.e. what type of resistive temperature device that is included in the sensing probes) connected to it using a sensor detection algorithm. Based on the type of temperature sensing probes detected, the measuring algorithm is adapted to use the correct measuring current and to correctly relate changes in resistance of the RTD with temperature changes.

Figure 3:
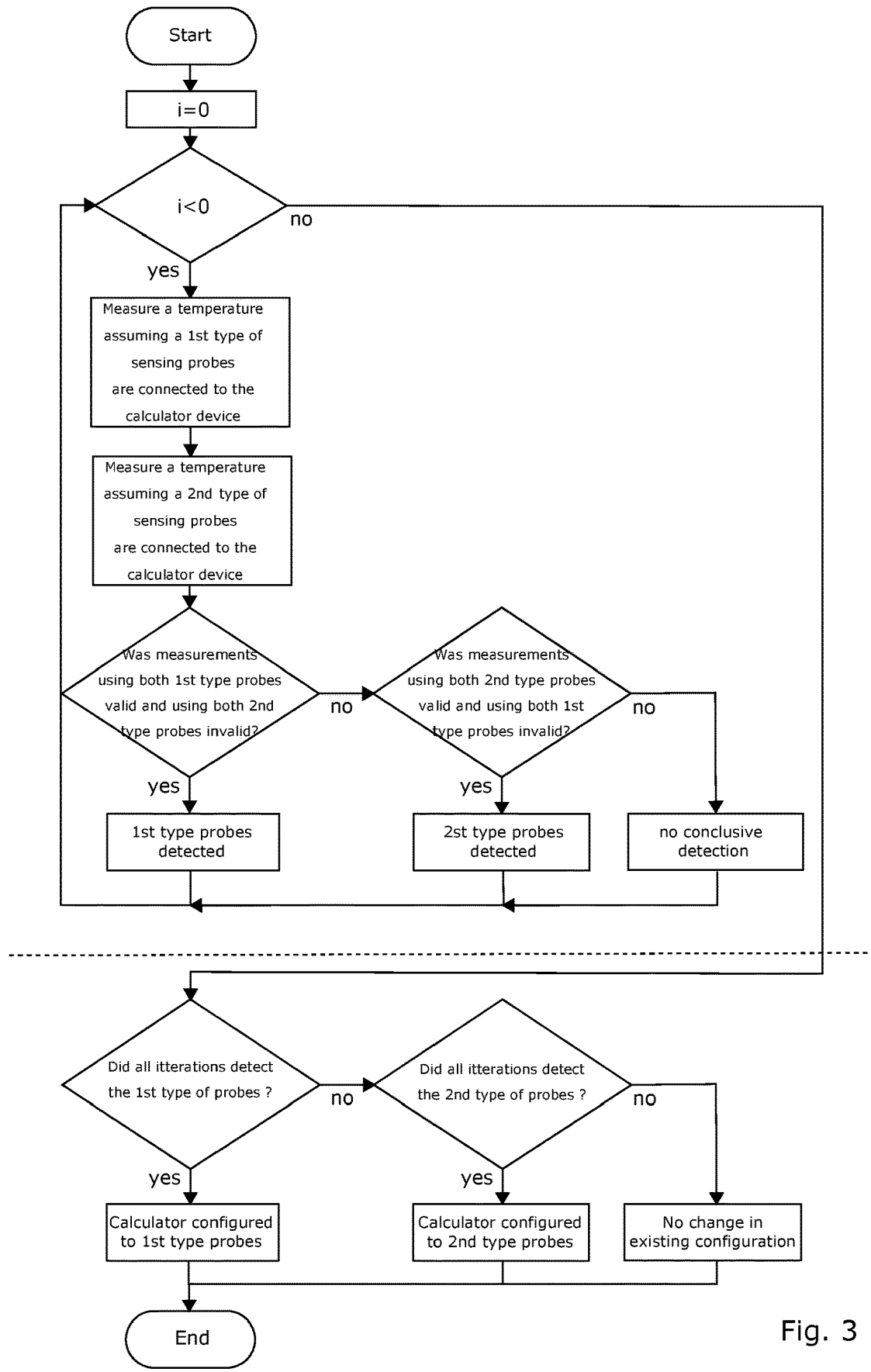
FIG. 3 shows a diagram illustrating the sensor detection algorithm.

Referring to FIG. 3, a sensor detection algorithm implementing a two-step process for detecting the type of temperature sensing probe, is described. In a first step, the sensor detection algorithm first attempts to measure a temperature assuming a first type of temperature sensing probes are connected to the calculator device. In one embodiment sensing probes of the Pt-500 type are first used, however other types of sensing probes could also be used for the first measurement attempt. Following the first attempt, the sensor detection algorithm attempts to measure a temperature assuming a second type of sensing probes are connected to the calculator device, such as Pt-100 sensing probes.

Following the two measuring sequences, the measuring results are analyzed, and the sensor detection algorithm determines whether the results are valid. Validity of the measuring results may be determined in a number of ways known to the skilled person. In one embodiment, a measured voltage drop is inputted into an analog to digital converter (ADC) to determine whether the voltage indicates that the temperature sensing probe is of the type it is assumed to be.

In one embodiment the sensor detection algorithm is configured to determine whether Pt-100 or Pt-500 temperature sensing probes are connected to the calculator device. However, the sensor detection algorithm may also be configured to determine whether other types of sensing probes are connected to the calculator device, such as whether Pt-500 and Pt-1000 temperature sensing probes are connected or Pt-100 and Pt-1000, or Pt-100, Pt-500 and Pt-1000. Pt-100, Pt-500 and Pt-1000 should just be considered examples and temperature sensing probes including resistive temperature devices having other reference resistances may also be used.

The sensor detection algorithm may consider a measurement result for a Pt-100 sensing probe to be valid if the measured voltage indicates a resistance of the RTD to be in an interval from 100-180 ohm. Similarly, a measurement for a Pt-500 sensing probe is considered valid if the measurement indicates a resistance of the RTD to be in an interval from 500-880 ohm. As readily recognized by the skilled person, wider or narrower ranges may also be applied.

If the measurements for both the first type of temperature sensing probes or both of the second type of temperature sensing probes (either Pt-100 or Pt-500 in the exemplary embodiment) are considered valid and the measurements for the other type are considered invalid, the algorithm preliminary determines that the temperature sensing probes yielding the valid results, are connected to the calculator device.

The first step of the sensor detection algorithm may be repeated a number of times, such as 2-4 times and a integer i may be set by the algorithm to indicate the number of iterations performed.

Following the first step, the sensor detection algorithm proceeds to a second step. In the second step the algorithm determines whether all preliminary determinations indicate that the same sensor probe type is connected to the calculator device. If this is the case, the calculator device determines that the respective sensor probe type is connected, and the calculator is configured accordingly. If all preliminary determinations do not indicate that the same sensor probe type is connected to the calculator device, the present configuration of the calculator device may be maintained, or no configuration is made based on the sensor detection algorithm.

Table 1 shows in detail the logic sequence and measuring steps performed during the sensor detection algorithm. Three different scenarios A, B and C are shown. In all scenarios the type of the two temperature sensing probes Sensor 1 and Sensor 2 connected to the calculator device are initially unknown to the calculator device of the utility meter. The calculator device is by default configured for measuring a Pt-100 probe, and the detection algorithm will in the following steps determine if this is correct or if it should switch to another measuring algorithm. In a first measuring step it injects an electrical current C-Pt-100 which in the case that a Pt-100 is connected will yield a result inside the working range of a Pt-100. In the table under scenario A a 1st measurement is made on Sensor 1, and the ohmic value so detected is inside the working range of a Pt-100. A flag True is set. Next Sensor 2 is measured and a flag True is set. The control device now changes the measuring algorithm to a Pt-500 algorithm and injects in a $2^{nd}$ measurement into Sensor 1 a signal injection type C-Pt-500. The value detected falls outside the Pt-500 range and a flag False is set. The same result with Sensor 2. The first measurement sequence of the two sensors is now finished but an iteration is made in a second measurement sequence with the $3^{rd}$ and $4^{th}$ measurements. The temperature measurements of Pt-100 are deemed valid, and Pt-100 is determined as the actual temperature probe connected to the calculator device. The original measuring algorithm is kept, i.e. not exchanged.

TABLE 1

| Signal injection type | A | | B | | C | |
|---|---|---|---|---|---|---|
| | Sensor 1 | Sensor 2 | Sensor 1 | Sensor 2 | Sensor 1 | Sensor 2 |
| 1st C-Pt-100 | True | True | False | False | True | True |
| 2nd C-Pt-500 | False | False | True | True | False | False |
| 3rd C-Pt-100 | True | True | False | False | True | True |
| 4th C-Pt-500 | False | False | True | True | False | True |

In scenario B the assumption by the control device is again that a Pt-100 is connected to it. But in the $1^{st}$ and the $3^{rd}$ measurement the results lies outside the range of a Pt-100. As none of the results from the $1^{st}$ to the $4^{th}$ measurements contradict each other the temperature measurements are deemed valid and a final determination on a Pt-500 sensor is made. The control device switches the measurement algorithm from a Pt-100 to a Pt-500 and keeps this setting for future operation. In scenario C the first measuring sequence of $1^{st}$ and $2^{nd}$ measurement indicates that the sensor type is a Pt-100. But the second measuring sequence, i.e. the iteration, gives an inconclusive result in the $4^{th}$ measurement of Sensor 2 as this result is in contradiction with the result False in the $2^{nd}$ measurement of Sensor 2. In this situation the sensor detection algorithm decides not to change the measurement algorithm and thus keep the Pt-100 algorithm.

The invention can be implemented by means of hardware, software, firmware or any combination of these. The invention or some of the features thereof can also be implemented as software running on one or more data processors and/or digital signal processors. The individual elements of an embodiment of the invention may be physically, functionally and logically implemented in any suitable way such as in a single unit, in a plurality of units or as part of separate functional units. The invention may be implemented in a single unit or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A utility meter for measuring thermal energy delivered to a point of consumption by a fluid supplied via a supply flow and a return flow, including:
    a flow meter unit for measuring a supply flow rate or return flow rate of the fluid;
    a pair of temperature sensing probes for measuring temperatures of the supply flow and the return flow, each of the temperature sensing probes including a resistive temperature device; and
    a calculator configured for executing a measuring algorithm for determining an amount of thermal energy delivered to the point of consumption over a period of time based on flow rates and temperatures received from the flow meter unit and temperature sensing probes, respectively;
    wherein the calculator is configured to detect a type of resistive temperature device included in the temperature sensing probes and to adapt the measuring algorithm according to the type of resistive temperature device and that the type of resistive temperature device included in the temperature sensing probes is detected using a sensor detection algorithm, the sensor detection algorithm including the steps of:
        attempting to measure temperature using a measuring algorithm adapted to a first type of temperature sensing probes, such as temperature sensing probes including resistive temperature devices of the Pt-100 type,
        attempting to measure temperature using a measuring algorithm adapted to a second type of temperature sensing probes, such as temperature sensing probes including resistive temperature devices of the Pt-500 type, and
        determining which of the temperature measurements are valid.

2. The utility meter according to claim 1, wherein the resistive temperature device is a platinum type and has a reference resistance from 50-1000 ohms at 0° C., such as a Pt-100, Pt-500 or Pt-1000 resistive temperature device.

3. The utility meter according to claim 1, wherein the calculator is configured to detect whether the resistive temperature device included in each of the temperature sensing probes connected to the calculator is a Pt-100 or a Pt-500 type.

4. The utility meter according to claim 3, wherein the sensor detection algorithm further includes the step of determining which of the temperature measurements that are invalid.

5. The utility meter according to claim 1, wherein the sensor detection algorithm includes performing multiple iterations of attempting to measure temperature using a measuring algorithm adapted to temperature sensing probes of a first type and a second type, respectively, before the utility meter is configured to use temperature sensing probes of the first type or the second type.

6. The utility meter according to claim 5, wherein a change in configuration to another measuring algorithm will not be made if a measurement during the sensor detection algorithm using a first signal injection type on a temperature sensing probe results in a sensor determination which is different from another determination of the same temperature sensing probe when using the first signal injection type.

7. The utility meter according to claim 1, wherein an ohmic range of the resistive temperature devices in the first type of temperature sensing probe is different from and does not overlap an ohmic range of the resistive temperature devices in the second type of temperature sensing probe.

* * * * *